(12) United States Patent
Lin et al.

(10) Patent No.: US 8,179,053 B2
(45) Date of Patent: May 15, 2012

(54) POWER SUPPLY FOR AN LCD DISPLAY

(75) Inventors: Yung-Lin Lin, Palo Alto, CA (US); Da Liu, San Jose, CA (US)

(73) Assignee: O2Micro International Limited, Grand Cayman (KY)

( * ) Notice: Subject to any disclaimer, the term of this patent is extended or adjusted under 35 U.S.C. 154(b) by 420 days.

(21) Appl. No.: 12/209,842

(22) Filed: Sep. 12, 2008

(65) Prior Publication Data

US 2009/0039796 A1 Feb. 12, 2009

Related U.S. Application Data

(60) Continuation of application No. 11/111,642, filed on Apr. 21, 2005, now Pat. No. 7,425,949, which is a division of application No. 10/414,374, filed on Apr. 15, 2003, now Pat. No. 6,936,975.

(51) Int. Cl.
   H05B 41/36 (2006.01)
   H05B 37/00 (2006.01)
(52) U.S. Cl. ........................... 315/224; 315/276
(58) Field of Classification Search ............ 315/276, 315/277, 278, 291, 307, 219, 312, 185 R, 315/185 S
See application file for complete search history.

(56) References Cited

U.S. PATENT DOCUMENTS

| | | |
|---|---|---|
| 4,417,181 A | 11/1983 | Leale |
| 4,461,980 A | 7/1984 | Nilssen |
| 4,535,399 A | 8/1985 | Szepesi |
| 4,541,041 A | 9/1985 | Park et al. |
| 4,672,528 A | 6/1987 | Park et al. |
| 4,682,082 A | 7/1987 | MacAskill et al. |
| 4,727,469 A | 2/1988 | Kammiller |
| 4,763,239 A | 8/1988 | Ball |
| 4,794,506 A | 12/1988 | Hino et al. |
| 4,814,962 A | 3/1989 | Magalhaes et al. |
| 4,833,584 A | 5/1989 | Divan |
| 4,855,888 A | 8/1989 | Henze et al. |
| 4,860,189 A | 8/1989 | Hitchcock |
| 4,864,483 A | 9/1989 | Divan |

(Continued)

FOREIGN PATENT DOCUMENTS

CN 1401205 A 3/2003

OTHER PUBLICATIONS

MP1010 Application Note Jan. 1, 2000 "MP1010 Resonant Mode CCFL Inverter" Monolithic Power Systems Inc. 23 Pgs.

(Continued)

*Primary Examiner* — Douglas W Owens
*Assistant Examiner* — Minh D A (57) ABSTRACT

A power supply system is provided for a multiple lamp LCD panel. In one aspect, the power supply includes a plurality of transformers for driving a plurality of respective CCFLs. The primary sides of each transformer are coupled in series to thereby reduce the stress on each transformer. For LCD panels that include longer CCFLs, a power supply is provided that includes a plurality of transformers for driving a plurality of respective CCFLs. The primary sides of each transformer are coupled in series and each lamp is coupled to two secondary sides of the transformers, thereby reducing the problems associated with longer CCFL tubes. In any of the embodiments, the power supply can be adapted to convert a high voltage DC signal to high voltage AC used to power the lamps.

28 Claims, 12 Drawing Sheets

U.S. PATENT DOCUMENTS

| | | | |
|---|---|---|---|
| 4,912,622 A | 3/1990 | Steigerwald et al. | |
| 4,935,857 A | 6/1990 | Nguyen et al. | |
| 4,952,849 A | 8/1990 | Fellows et al. | |
| 4,953,068 A | 8/1990 | Henze | |
| 4,992,919 A | 2/1991 | Lee et al. | |
| 5,012,058 A | 4/1991 | Smith | |
| 5,017,800 A | 5/1991 | Divan | |
| 5,027,263 A | 6/1991 | Harada et al. | |
| 5,027,264 A | 6/1991 | DeDoncker et al. | |
| 5,105,127 A | 4/1992 | Lavaud et al. | |
| 5,113,334 A | 5/1992 | Tuson et al. | |
| 5,132,888 A | 7/1992 | Lo et al. | |
| 5,132,889 A | 7/1992 | Hitchcock et al. | |
| 5,157,592 A | 10/1992 | Walters | |
| 5,198,969 A | 3/1993 | Redl et al. | |
| 5,208,740 A | 5/1993 | Ehsani | |
| 5,231,563 A | 7/1993 | Jitaru | |
| 5,235,501 A | 8/1993 | Stuart et al. | |
| 5,268,830 A | 12/1993 | Loftus, Jr. | |
| 5,285,372 A | 2/1994 | Huynh et al. | |
| 5,291,382 A | 3/1994 | Cohen | |
| 5,305,191 A | 4/1994 | Loftus, Jr. | |
| 5,363,020 A | 11/1994 | Chen et al. | |
| 5,384,516 A | 1/1995 | Kawabata et al. | |
| 5,402,329 A | 3/1995 | Wittenbreder, Jr. | |
| 5,412,557 A | 5/1995 | Lauw | |
| 5,418,703 A | 5/1995 | Hitchcock et al. | |
| 5,420,779 A | 5/1995 | Payne | |
| 5,422,546 A | 6/1995 | Nilssen | |
| 5,430,632 A | 7/1995 | Meszlenyi | |
| 5,430,641 A | 7/1995 | Kates | |
| 5,448,155 A | 9/1995 | Jutras | |
| 5,448,467 A | 9/1995 | Ferreira | |
| 5,481,160 A | 1/1996 | Nilssen | |
| 5,510,974 A | 4/1996 | Gu et al. | |
| 5,514,921 A | 5/1996 | Steigerwald | |
| 5,546,300 A | 8/1996 | Lee et al. | |
| 5,557,176 A * | 9/1996 | O'Brien | 315/307 |
| 5,559,688 A | 9/1996 | Pringle | |
| 5,615,093 A | 3/1997 | Nalbant | |
| 5,619,402 A | 4/1997 | Liu | |
| 5,638,260 A | 6/1997 | Bees | |
| 5,646,836 A | 7/1997 | Sadarnac et al. | |
| 5,669,238 A | 9/1997 | Devers | |
| 5,684,683 A | 11/1997 | Divan et al. | |
| 5,694,007 A | 12/1997 | Chen | |
| 5,712,533 A | 1/1998 | Corti | |
| 5,715,155 A | 2/1998 | Shahani et al. | |
| 5,719,474 A | 2/1998 | Vitello | |
| 5,719,759 A | 2/1998 | Wagner et al. | |
| 5,731,652 A | 3/1998 | Shimada | |
| 5,736,842 A | 4/1998 | Jovanovic | |
| 5,742,134 A | 4/1998 | Wacyk et al. | |
| 5,742,495 A | 4/1998 | Barone | |
| 5,742,496 A | 4/1998 | Tsutsumi | |
| 5,744,915 A | 4/1998 | Nilssen | |
| 5,748,457 A | 5/1998 | Poon et al. | |
| 5,764,494 A | 6/1998 | Schutten et al. | |
| 5,767,630 A * | 6/1998 | Williams | 315/282 |
| 5,774,346 A | 6/1998 | Poon et al. | |
| 5,781,418 A | 7/1998 | Chang et al. | |
| 5,781,419 A | 7/1998 | Kutkut et al. | |
| 5,784,266 A | 7/1998 | Chen | |
| 5,796,598 A | 8/1998 | Nowak et al. | |
| 5,818,172 A | 10/1998 | Lee | |
| 5,818,669 A | 10/1998 | Mader | |
| 5,822,201 A * | 10/1998 | Kijima | 363/25 |
| 5,834,889 A | 11/1998 | Ge | |
| 5,844,540 A | 12/1998 | Terasaki | |
| 5,854,617 A | 12/1998 | Lee et al. | |
| 5,856,916 A | 1/1999 | Bonnet | |
| 5,874,809 A | 2/1999 | Hagen | |
| 5,875,103 A | 2/1999 | Bhagwat et al. | |
| 5,880,940 A | 3/1999 | Poon | |
| 5,886,477 A | 3/1999 | Honbo et al. | |
| 5,886,884 A | 3/1999 | Baek et al. | |
| 5,894,412 A | 4/1999 | Faulk | |
| 5,910,709 A | 6/1999 | Stevanovic et al. | |
| 5,917,722 A | 6/1999 | Singh | |
| 5,923,129 A | 7/1999 | Henry | |
| 5,930,121 A | 7/1999 | Henry | |
| 5,932,976 A | 8/1999 | Maheshwari et al. | |
| 5,939,830 A | 8/1999 | Praiswater | |
| 5,946,200 A | 8/1999 | Kim et al. | |
| 5,965,989 A | 10/1999 | Mader | |
| 6,008,590 A | 12/1999 | Giannopoulos et al. | |
| 6,011,360 A | 1/2000 | Gradzki et al. | |
| 6,051,940 A | 4/2000 | Arun | |
| 6,091,206 A | 7/2000 | Siao | |
| 6,104,146 A * | 8/2000 | Chou et al. | 315/277 |
| 6,114,814 A | 9/2000 | Shannon et al. | |
| 6,151,232 A | 11/2000 | Furuhashi et al. | |
| 6,198,236 B1 | 3/2001 | O'Neill | |
| 6,259,615 B1 | 7/2001 | Lin | |
| 6,304,137 B1 | 10/2001 | Pullen et al. | |
| 6,310,444 B1 | 10/2001 | Chang | |
| 6,313,976 B1 | 11/2001 | Balakrishnan et al. | |
| 6,424,247 B2 * | 7/2002 | Suzuki | 336/110 |
| 6,459,216 B1 * | 10/2002 | Tsai | 315/294 |
| 6,469,454 B1 | 10/2002 | Mader et al. | |
| 6,501,234 B2 | 12/2002 | Lin et al. | |
| 6,559,606 B1 | 5/2003 | Chou et al. | |
| 6,567,866 B1 | 5/2003 | Poisner | |
| 6,568,774 B2 | 5/2003 | Hitzschke et al. | |
| 6,580,229 B2 | 6/2003 | Murakami et al. | |
| 6,717,372 B2 | 4/2004 | Lin et al. | |
| 6,750,842 B2 | 6/2004 | Yu | |
| 6,812,916 B2 | 11/2004 | Hwang | |
| 6,870,330 B2 * | 3/2005 | Choi | 315/307 |
| 6,936,975 B2 | 8/2005 | Lin et al. | |
| 2002/0047619 A1 | 4/2002 | Oura et al. | |
| 2002/0057584 A1 | 5/2002 | Brockmann | |
| 2002/0130628 A1 | 9/2002 | Shin | |
| 2003/0151601 A1 | 8/2003 | Chung et al. | |
| 2004/0017163 A1 | 1/2004 | Hsu | |
| 2004/0032223 A1 | 2/2004 | Henry | |
| 2004/0066149 A1 | 4/2004 | Gray | |
| 2004/0155601 A1 | 8/2004 | Chou et al. | |

OTHER PUBLICATIONS

MP1010 Monolithic Power Systems, Inc. "Cold Cathode Fluorescent Lamp Driver" Aug. 2000 Rev 1.3 total 5 pgs.
MP1010 Monolithic Power Systems, Inc. "Cold Cathode Fluorescent Lamp Driver" Preliminary Data Sheet V.2 Feb. 1999 6pgs.
MP1010 Monolithic Power Systems, Inc. "Cold Cathode Fluorescent Lamp Driver" Version 1.0 Jul. 1999 5pgs.
MP1010 Monolithic Power Systems, Inc. "Cold Cathode Fluorescent Lamp Driver" Version 1.2 Oct. 1999 5pgs.
MP1010 Monolithic Power Systems, Inc. "Cold Cathode Fluorescent Lamp Driver" Version 1.1 Sep. 1999 5pgs.
MP1011, Monolithic Power Systems, Inc. "Cold Cathode Fluorescent Lamp Driver" Preliminary Data Sheet Oct. 1999 5pgs.
UCC1972/3, UCC2972/3, UCC3972/3 Unitrode "BiCMOS Cold Cathode Fluorescent Lamp Driver Controller" Jan. 2000 17 pgs.
UCC1972/3, UCC2972/3, UCC3972/3 Unitrode "BiCMOS Cold Cathode Fluorescent Lamp Driver Controller" Oct. 1998 revised Nov. 2000 17 pgs.
UCC2975, UCC2976, UCC2977, UCC3975, UCC3976, UCC3977 Texas Instruments "Multi-Topology Piezoelectric Transformer Controller" Jan. 2002 30 pgs.
OZ960A "High-Efficiency Inverter Controller" 9pgs.
Society for Information Display, International Symposium, Digest of Technical Papers vol. XXIX, Anaheim Convention Center Anaheim, CA. May 17-22, 1998 Coles, Late-News Paper—7pgs.
EDN Web Printout—Integrated Circuits: Mar. 1, 1996 4pgs.
LT1070 Design Manual, Application Notes 19, Jun. 1986, Carl Nelson 80pgs.
ML4878 & Assoc. Docs Oct. 1998 Micro Linear "Single Stage LCD Backlight Lamp Driver" 40 pgs.
ML4878 Feb. 1997 Micro Linear "ML4878 LCD Backlight Lamp Driver" 14 pgs.
ML4878 Oct. 1998 Micro Linear "Single Stage LCD Backlight Lamp Driver" 17 pgs.

ML Application Note 68, May 1998 "ML4878 Single-Stage CCFL Backlight Resonant Inverter" 12 pgs.

ML1010 AN-01, May 1999 "Designing CCFL Inverters with the MP1010" 7 pgs.

ML1010 AN-01, May 1999 "Designing CCFL Inverters with the MP1010" 6 pgs Version.11.

Jim Williams, A Fourth Generation of LCD Backlight Technology, Linear Technology, Nov. 1995, Application Note 65.

"Phase Shifted, Zero Voltage Transition Design Considerations and the UC3875 PWM Controller", by Bill Andreycak, Unitrode, Application Note, May 1997, pp. 1-14.

"Fixed-Frequency, Resonant-Switched Pulse Width Modulation with Phase-Shifted Control", by Bob Mammano and Jeff Putsch, from Power Supply Design Seminar, Unitrode, 1991, pp. 5-1 to 5-7.

"A Frequency/PWM Controlled Converter with Two Independently Regulated Outputs", by R.A. Fisher, et al., HFPC, May 1989, pp. 459-471.

"High Density Power-Hybrid Design of a Half-Bridge Multi-Resonant Converter", by Richard Farrington, et al., HFPC-Virginia Polytechnic Institute, May 1990. pp. 26-33.

"Small-Signal Analysis of the Zero-Voltage Switched Full-Bridge PWM Converter", V. Vlatkovic, et al., HFPC-Virginia Polytechnic Institute, May 1990, pp. 262-272.

Advanced Power Technology, "A New Generation of Power MOSGET Offers Improved Performance at Reduced Cost", by Ken Dierberger, 2001.

"An Introduction to the Principles and Features of Resonant Power Conversion", Steve Freeland, from Recent Developments in Resonant Power Conversion, Intertec Communications, Inc., Dated 1988, pp. 20-43.

"Zero-Voltage Switching Techniques in DC/DC Converters", Kwang-Hwa Liu and Fed C. Lee, from Recent Developments in Resonant Power Conversion, Intertec Communications, Inc., Dated 1988, pp. 211-223.

"Switching Power Supply Design", Abraham I. Pressman, McGraw-Hill, Dated 1991 pp. 93-104; 471-492.

"Zero Voltage Switching Resonant Power Conversion", by Bill Andreycak, from Power Supply Design Seminar, Unitrode, Dated 1991, pp. A2-1 to A2-24; and A2-1A to A2-3A.

"Resonant Mode Converter Topologies", by Bob Mammano, from Power Supply Design Seminar, Unitrode, Dated 1991, pp. P3-1 to P3-12.

"The New US3879 Phase-Shifted PWM Controller Simplifies the Design of Zero Voltage Transition Full-Bridge Converters" by Laszlo Balogh, Unitrode, Application Note, Dated 1995, pp. 1-8.

"A Comparative Study of a Class of Full-Bridge Zero-Voltage-Switched PWM Converters", by W, Chen, et al., Dated 1995 IEEE, pp. 893-899.

"Optimum ZVS Full-Bridge DC/DC Converter with PWM Phase-Shift Control: Analysis, Design Consideration, and Experimental Results", by Richard Red I, et al., Dated 1994 IEEE, pp. 159-165.

"Feasible Characteristics Evaluation of Resonant Tank PWM Inverter-Linked DC-DC High-Power Converters for Medical-Use High-Voltage Application", b H. Takano, et al., Dated 1995 IEEE, pp. 913-919.

English Translation of Taiwan Office Action in Corresponding Taiwan Patent Application No. 93109968 dated May 16, 2005 (5 pages).

"A New and Improved Control Technique Greatly Simplifies the Design of ZVS Resonant Inverters and DC/DC Power Supplies", Mehmet K. Nalbant, Dated 1995 IEEE pp. 694-701.

* cited by examiner

FIG. 3A
PRIOR ART
CLASS D

POWER SUPPLY FOR AN LCD DISPLAY

CROSS-REFERENCE TO RELATED APPLICATIONS

This application is a continuation of the U.S. application Ser. No. 11/111,642, filed on Apr. 21, 2005, now U.S. Pat. No. 7,425,949, which itself is a divisional of the U.S. application Ser. No. 10/414,374, filed on Apr. 15, 2003, now U.S. Pat. No. 6,936,975, which is hereby incorporated by reference in its entirety.

FIELD OF THE INVENTION

The present invention relates to a power supply for an LCD panel display, and more particularly, to a backlight power supply that provides power for multiple CCFLs for a Liquid Crystal Display Television (LCDTV).

BACKGROUND OF THE INVENTION

Figure 1:
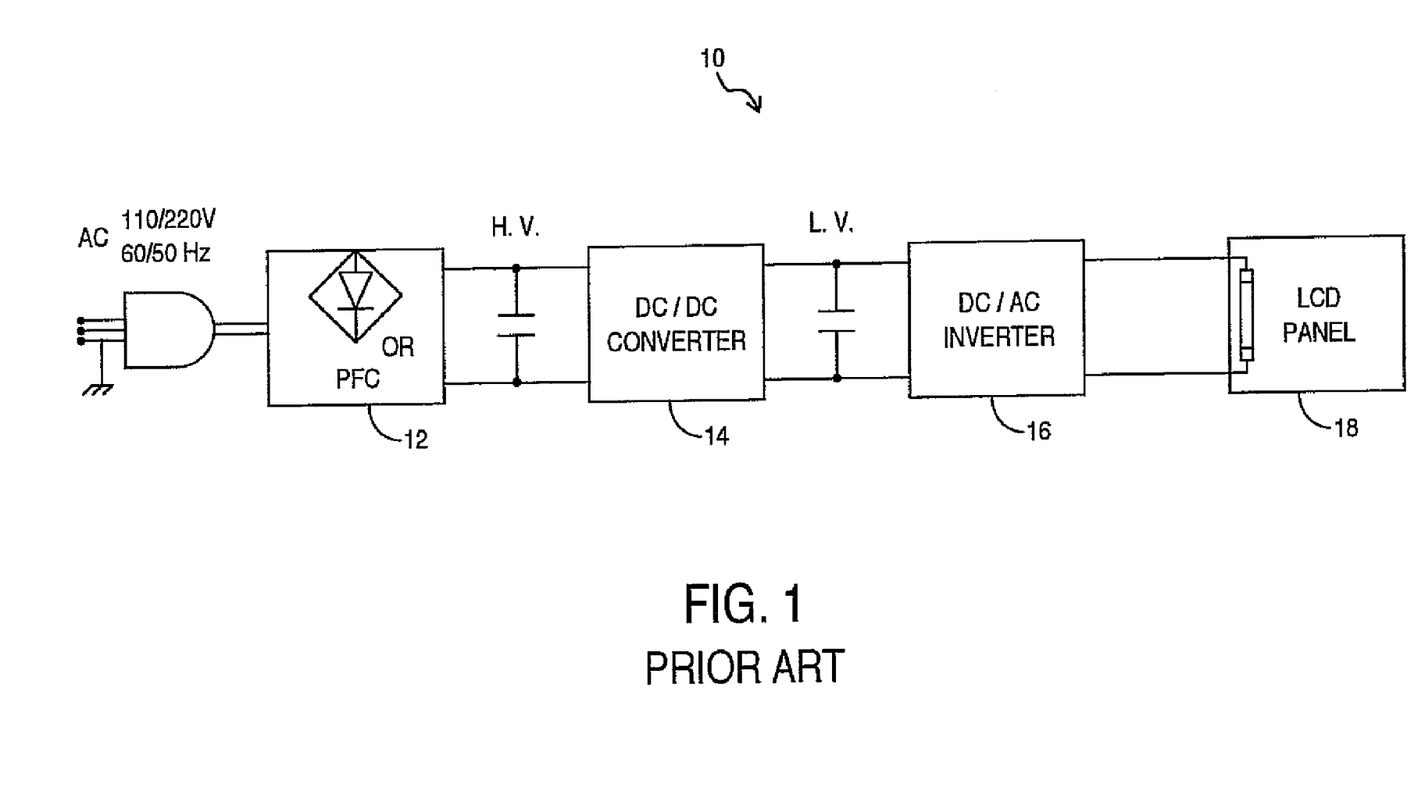
FIG. 1 is a block diagram of a conventional power supply system for an LCD panel.

FIG. 1 depicts a conventional power supply system 10 for an LCD panel. In the conventional system, the utility power, 110V/220V ac system is converted to a high-voltage dc either through a rectifier circuit or a power factor correction circuit 12. The high-voltage dc is then step down through a dc/dc converter 14 to provide lower voltages, for example, 5V and 12V as the power sources for electronic devices such as microcontroller, memory, TFT driver, graphics and cold-cathode fluorescent lamps (CCFLs). The inverter 16 further converts the low-voltage dc to a high-voltage ac to provide power for the CCFLs in the LCD panel 18. Multiple power conversions through the DC/DC converter 14 and D/AC inverter 16 impacts the conversion efficiency and also generates heat in the system. For large LCD panels such as for LCDTV applications, the majority of power consumption resides in CCFLs. Therefore, it is important to boost the efficiency of the inverter for the CCFLs.

Figure 2:
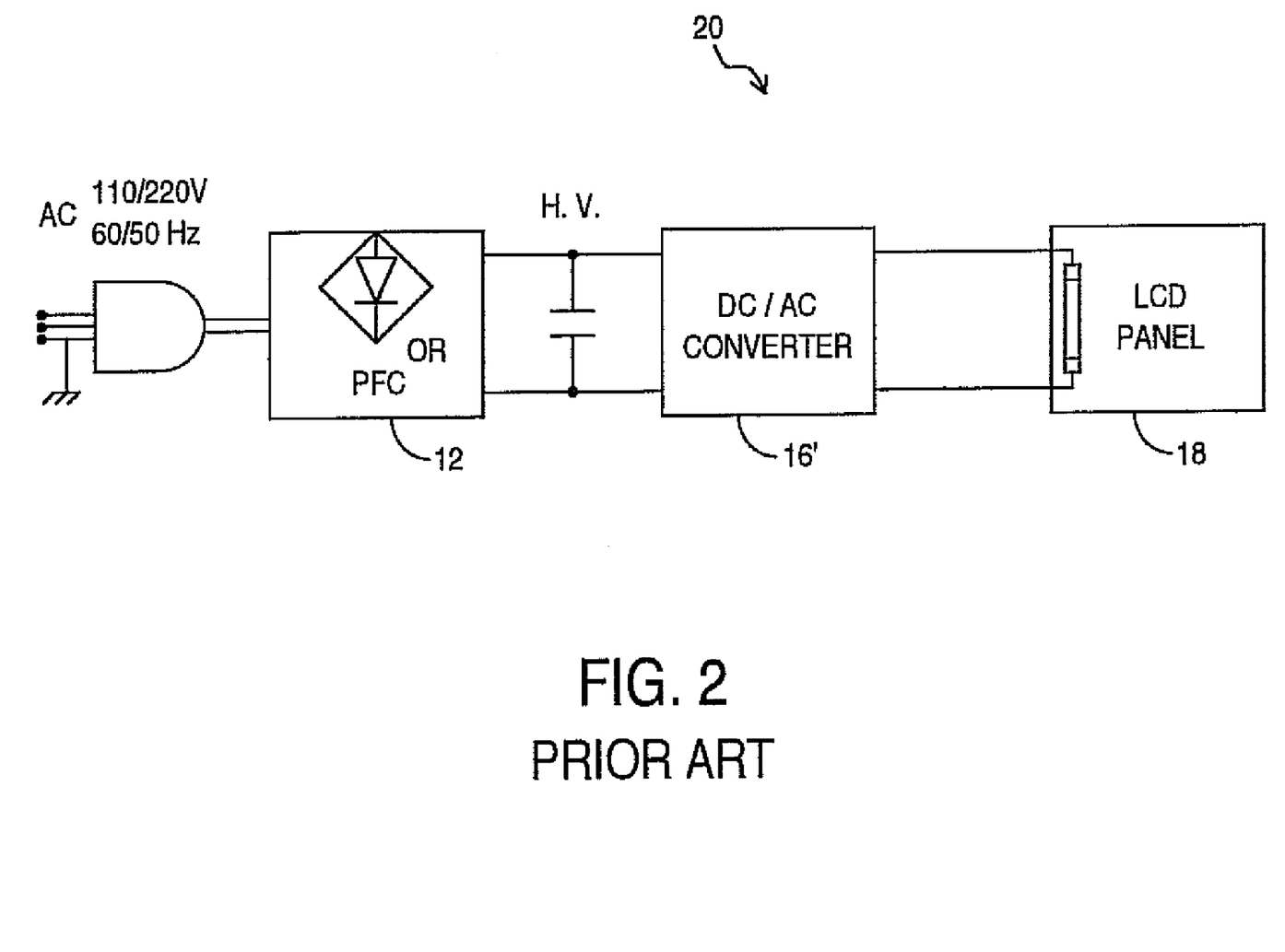
FIG. 2 is a block diagram of another conventional power supply system for an LCD panel.

FIG. 2 illustrates one conventional topology 20 that improves the efficiency of the inverter system. The high-voltage dc is directly applied to the DC/AC converter 16'. It eliminates an intermediate step of DC/DC converter and improves the overall efficiency.

Figure 3:
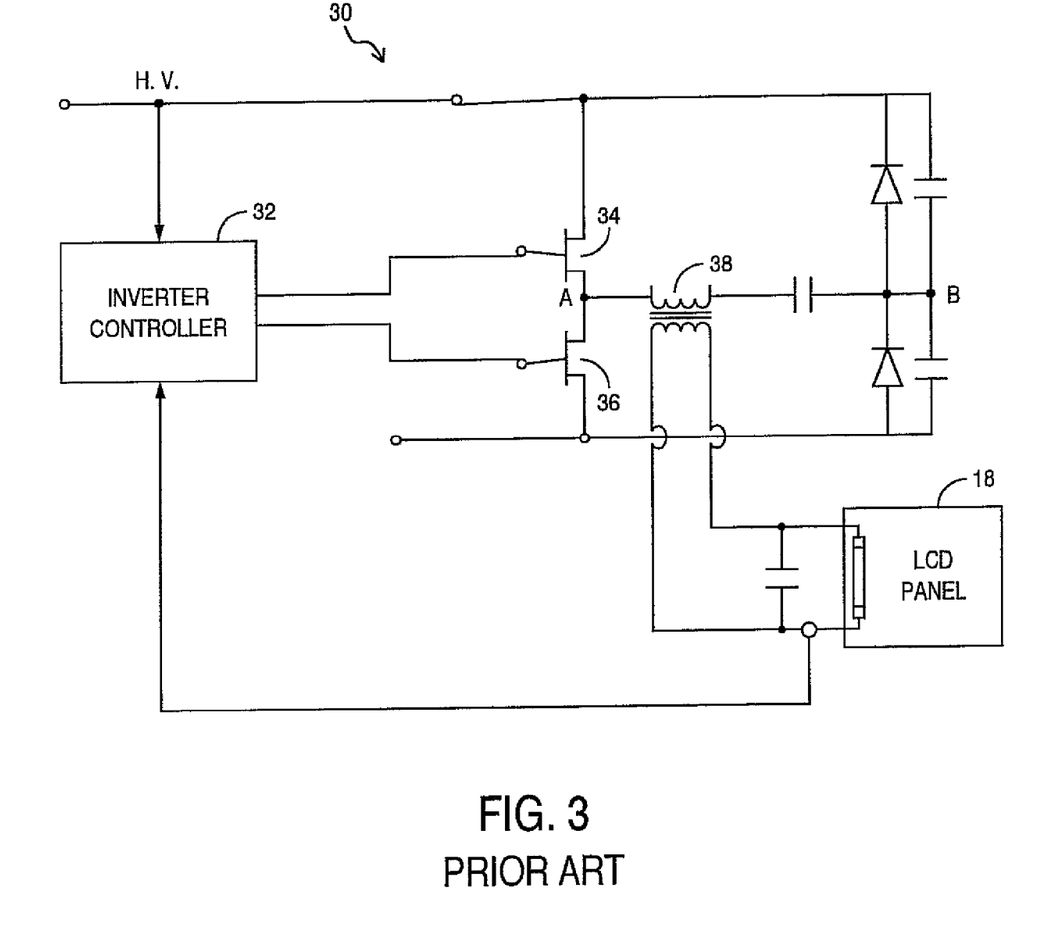
FIG. 3 is a circuit diagram of a conventional inverter topology for an LCD panel.
Figure 3A:
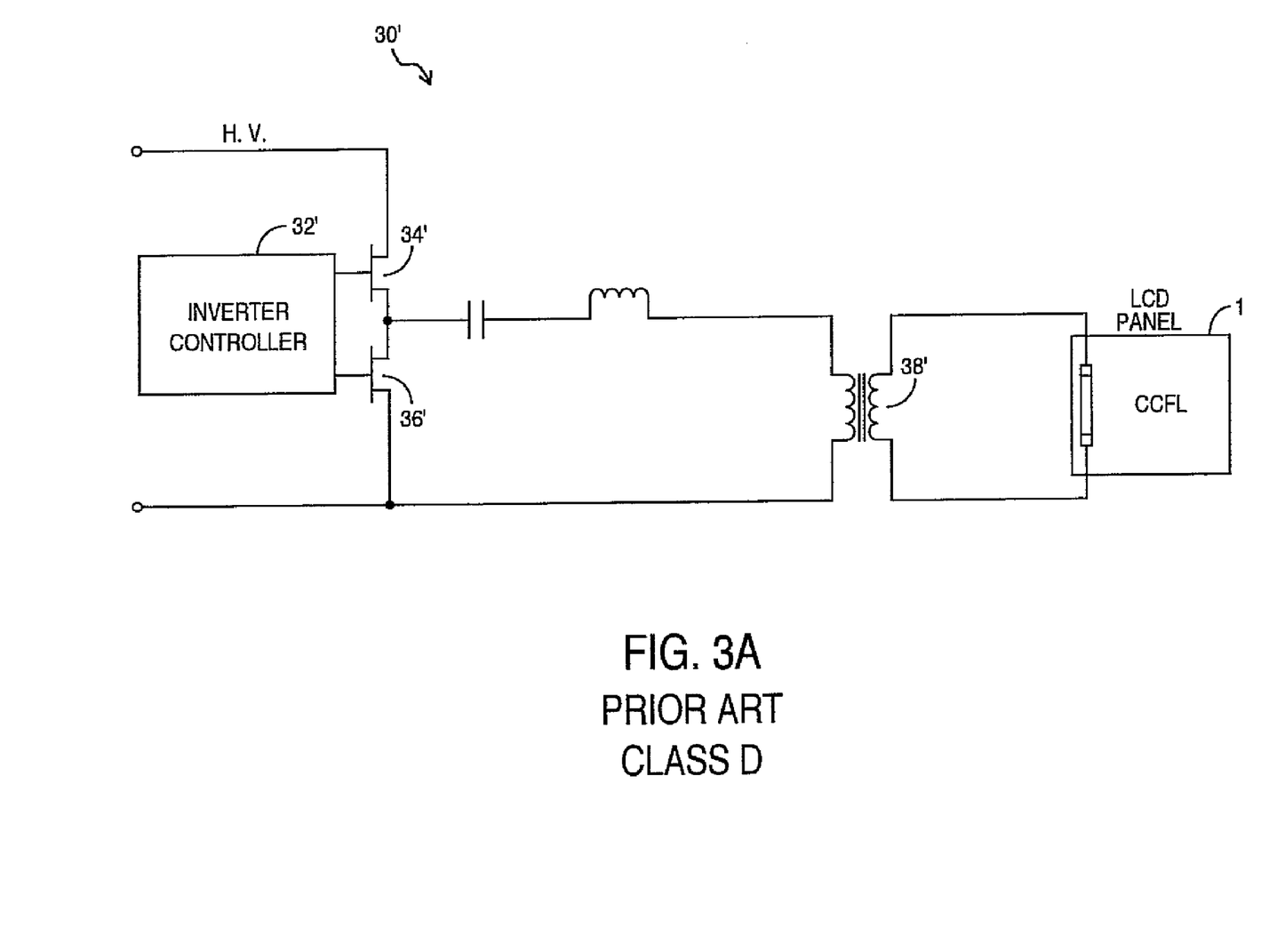
FIG. 3A is another circuit diagram of a conventional inverter topology for an LCD panel.
Figure 4:
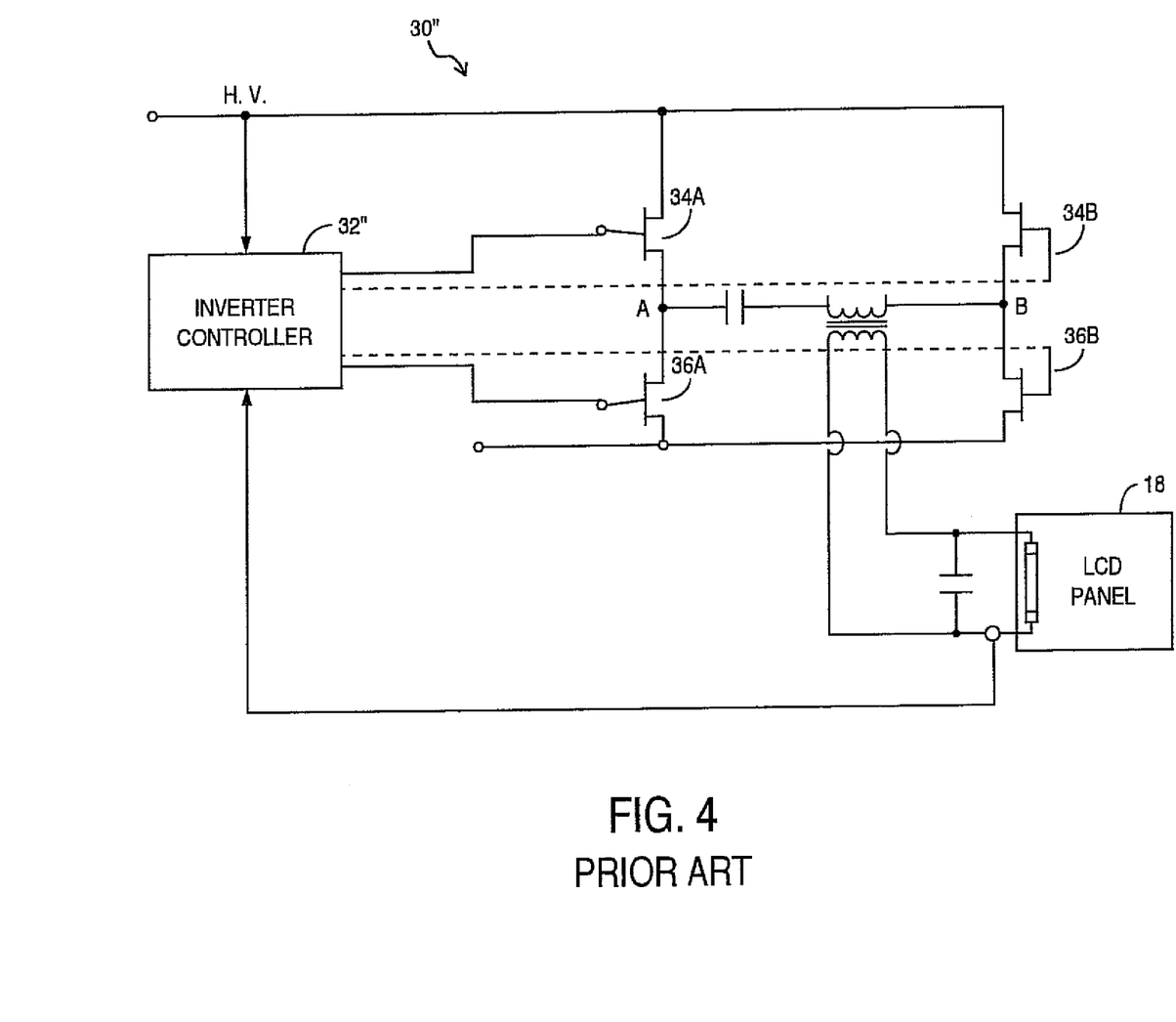
FIG. 4 is another circuit diagram of a conventional inverter topology for an LCD panel.

Converting a high-voltage dc to an ac signal requires a lower turns-ratio transformer to the CCFL as illustrated in FIG. 3, FIG. 3A and FIG. 4. FIG. 3 depicts an inverter topology 30 that is built around a half bridge circuit (two switches) and includes an inverter controller 32 that drives two switches 34 and 36 to develop the necessary voltage across the transformer 38. The inverter controller 32 and half bridge topologies are well known in the art. FIG. 3A depicts a Class D inverter topology and FIG. 4 depicts a full bridge (four switch) inverter topology, as are well understood in the art. Since the size of the transformer is selected based on the CCFL applications, the secondary winding which drives the CCFL is generally fixed by the load requirements. However, the number of turns in the primary winding in high-voltage input application is much higher than the transformer being driven by the low-voltage input such as 5V to 20V DC, and this increases the complexity and cost of the transformer.

SUMMARY OF THE INVENTION

In one aspect the present invention provides a power supply system for an LCD panel that includes:

an inverter controller operable to control a plurality of switches for converting a DC signal to a high voltage AC signal;

a plurality of transformers receiving the high voltage AC signal and each generating a high voltage sinusoidal signal, wherein each said transformer having a primary side and a secondary side and wherein each primary side being coupled in series with each other across the high voltage AC signal; and an LCD panel comprising a plurality of cold cathode fluorescent lamps, each lamp being powered by a respective secondary side of said transformer.

In another aspect, the present invention provides a power supply system for an LCD panel that includes:

an inverter controller operable to control a plurality of switches for converting a DC signal to a high voltage AC signal;

a plurality of transformers receiving said high voltage AC signal and each generating a high voltage sinusoidal signal, wherein each said transformer having a primary side and a secondary side and wherein each said primary side being coupled in series with each other across said high voltage AC signal; and an LCD panel comprising a plurality of cold cathode fluorescent lamps, each said lamp being powered by at least two respective secondary sides of said transformers.

In any of the described herein embodiments, the power supply can be adapted to convert a high voltage DC signal to high voltage AC used to power the lamps.

It will be appreciated by those skilled in the art that although the following Detailed Description will proceed with reference being made to preferred embodiments and methods of use, the present invention is not intended to be limited to these preferred embodiments and methods of use. Rather, the present invention is of broad scope and is intended to be limited as only set forth in the accompanying claims.

Other features and advantages of the present invention will become apparent as the following Detailed Description proceeds, and upon reference to the Drawings, wherein like numerals depict like parts, and wherein:

DETAILED DESCRIPTION OF EXEMPLARY EMBODIMENTS

Usually, there are multiple CCFLs in LCDTV applications to provide sufficient brightness on the LCD screen, for example, 4 to 32 CCFLs depending on the size of the LCD panel. In one aspect of the present invention the primary winding of the transformers are coupled in series in the power conversion process.

Figure 5:
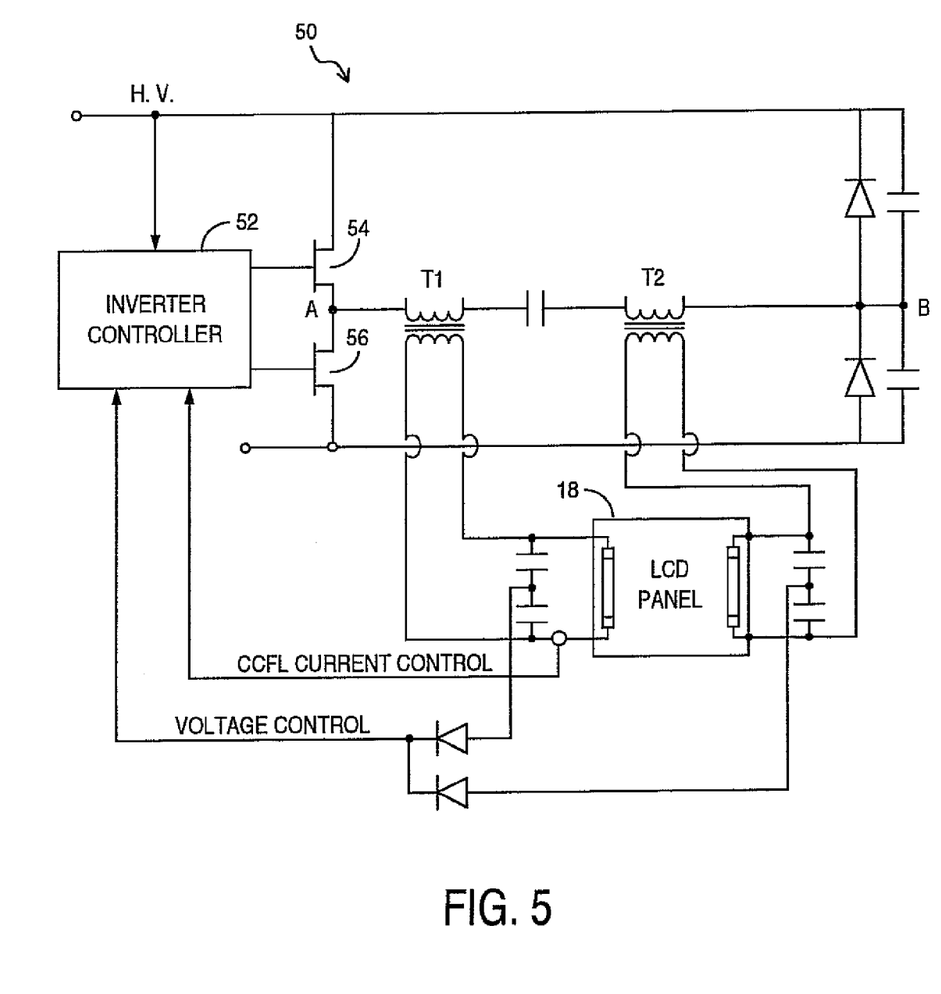
FIG. 5 is an inverter topology for an LCD panel according to one exemplary embodiment of the present invention.
Figure 5A:
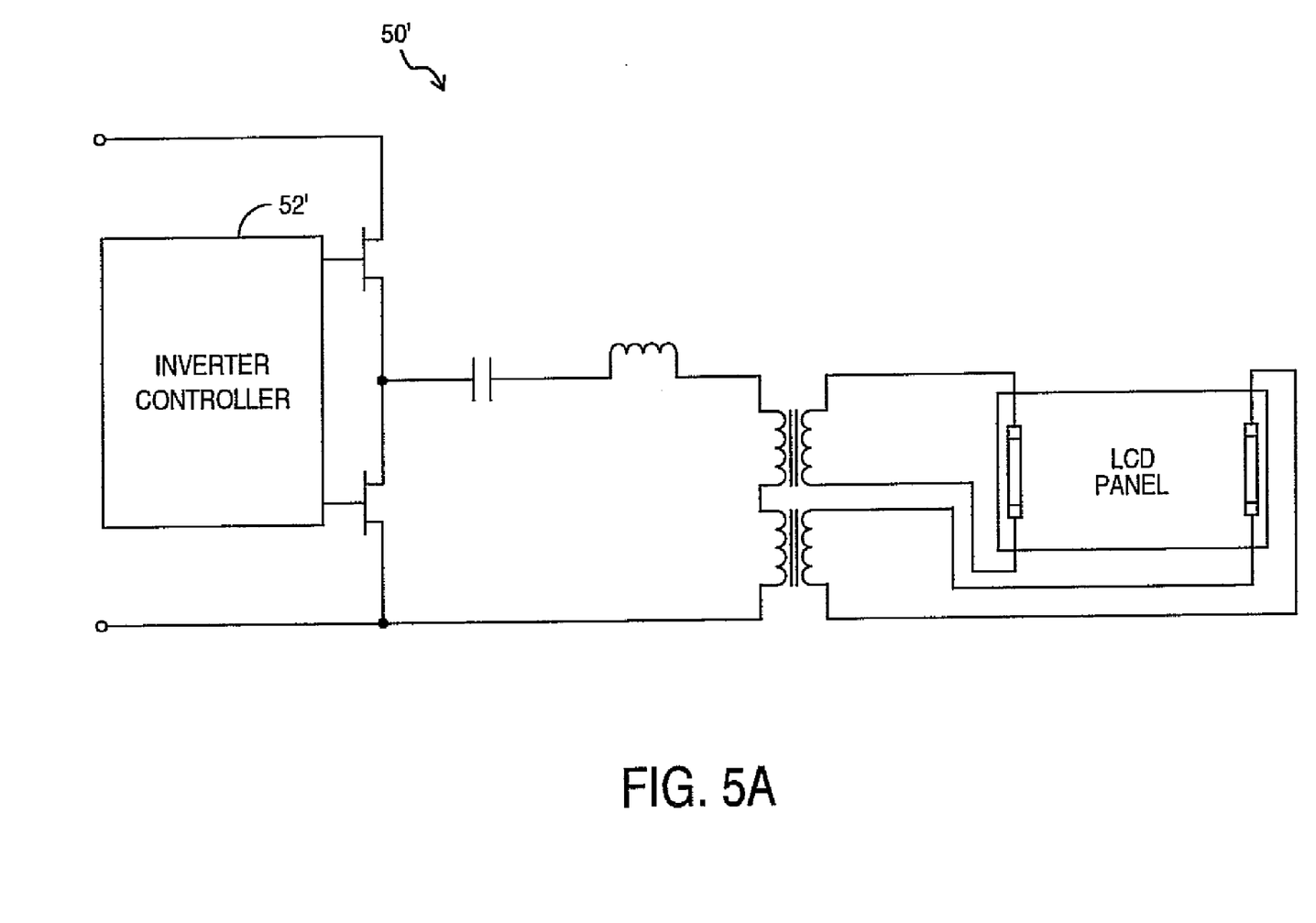
FIG. 5A is an inverter topology for an LCD panel according to another exemplary embodiment of the present invention.

FIG. 5 is an inverter topology 50 for an LCD panel according to one exemplary embodiment of the present invention. In this exemplary embodiment, each primary side of the transformers T1 and T2 is connected in series. Therefore, each primary side sees half of the input voltage across the winding. This operates to reduce the number of turns into half as comparing to transformer primary winding in FIG. 4. In half-bridge applications as depicted in FIG. 5, placing the primary side of the transformers in series reduces to one-fourth of the input voltage across each winding, and the voltage stress reduced to 1/(2N) of the input voltage when applied to a half-bridge application (where N is the number of transformers coupled in series). Of course, the topology of FIG. 4 can be modified to a full bridge topology, in which case the voltage stress on each primary winding would be reduced to 1/N of the input voltage when N transformers are connected with their primary winding in series. FIG. 5A depicts a class D inverter topology, having similar advantages as set forth above with respect to FIG. 5 since the primary side of the transformers are coupled in series.

Figure 6:
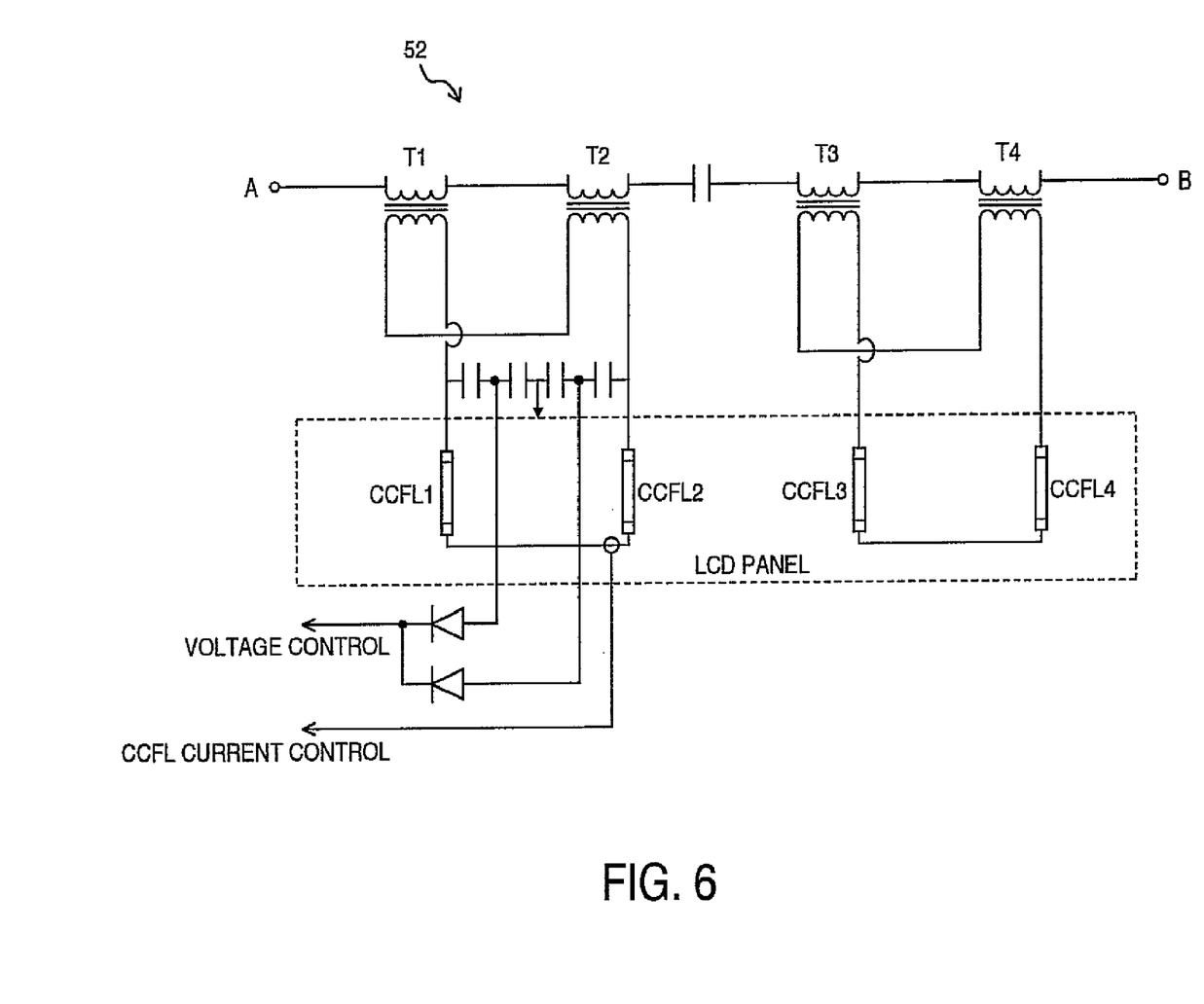
FIG. 6 is a circuit diagram of the transformers and LCD panel of the inverter topology according to the present invention.

FIG. 6 is a circuit diagram 52 of the transformers and LCD panel of the inverter topology according to the present invention. In this figure, the concept is extended to power four CCFL lamps by coupling four primary sides T1, T2, T3, and T4 in series between points A and B of FIG. 5. Likewise, this topology 52' is extended to N lamps in FIG. 7 which depicts N CCFLs powered by N transformers.

Since each of the primary winding is connected in series, the current flowing through each transformer primary side is identical during the turn-on, turn-off of the switched network (i.e., the switches of the half bridge, full bridge or Class D circuits). The switched network is connected to point "A" and "B" in FIGS. 5, 6 and 7. This configuration further improves the current balance in the secondary side of each transformer driving the CCFLs.

Figure 8:
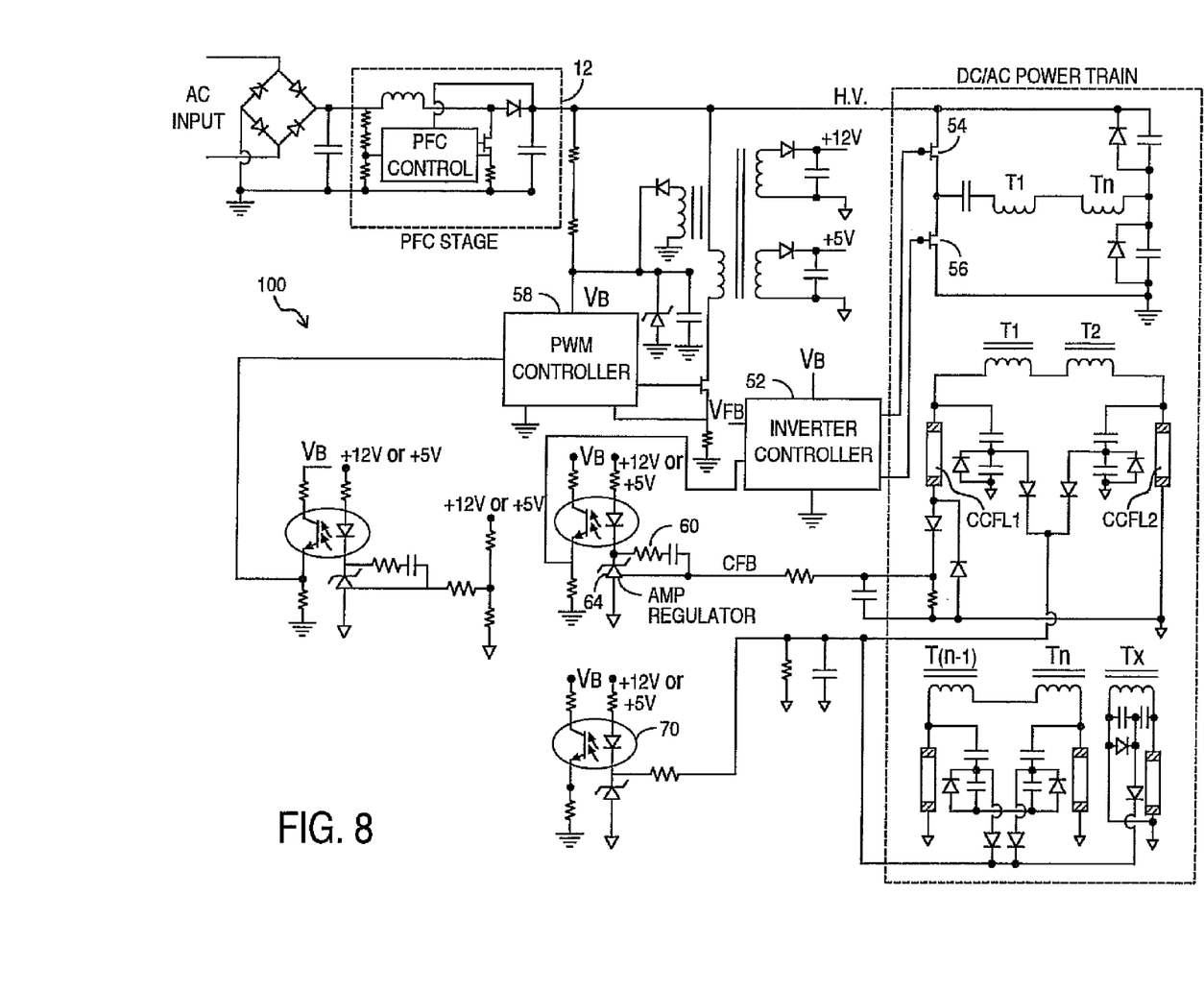
FIG. 8 is a detailed circuit diagram of the LCD power supply system of the present invention.

FIG. 8 depicts a detailed circuit diagram of an exemplary LCD power supply system 100 of the present invention. This power supply includes an inverter controller 52 that drives two switches 54 and 56 in a half bridge circuit, as described in FIG. 5 above. The inverter controller 52 includes voltage and current feedback to control the energy of the CCFLs coupled to the circuit. Each CCFL is driven by a primary side transformer that is coupled in series as shown (i.e., T1, T2 . . . T(n−1), Tn, Tx; where n represents an even number of lamps, and x represents an odd number of lamps) according to the principles and description set forth above.

Current feedback is developed with feedback circuitry 60 which is derived from lamps 1 and 2 in the circuit as shown. The exemplary current feedback circuit 60 includes an opto-coupler 62 and a regulator 64. The regulator amplifies the current feedback signal Cfb and the opto-coupler 62 sends the feedback information to the controller 52. Similarly, voltage feedback information is developed with voltage feedback circuitry 70. In this exemplary embodiment, voltage feedback information is taken from each lamp in the circuit to generate a voltage feedback signal Vb.

The detailed circuit of FIG. 8 also includes other circuitry not directly related to the aspects of the present invention. For example, a PWM controller 58 may be provided to generate DC power supply signals (e.g., 12V and 5V) for other components (e.g., memory, microprocessor, etc.) associated with an LCD display. Likewise, the PFC stage 12 may utilize any conventional and/or custom topology to generate a high voltage DC signal, as described above.

In another aspect, the present invention provides a circuit topology for driving long CCFL tubes. The size of the CCFL tubes in LCDTV applications is usually longer than those in LCD monitor in portable equipment. Driving longer CCFL becomes more difficult. For example, any lamp longer than approximately 60 cm conventional driving methods, as shown in FIGS. 3, 3A and 4, a high-frequency and high-voltage (normally in the range of 1000V rms) is applied to the CCFL while one side of the CCFL has a potential near chassis ground. Due to the leakage current path between the CCFL and the chassis, these driving methods usually encounter a darkness effect on one side of the CCFL. Long lamp may mean 75-80 cm or longer, and is generally defined as lamps having a leakage capacitance such that it affects electron migration between the electrodes of the lamp.

Figure 9:
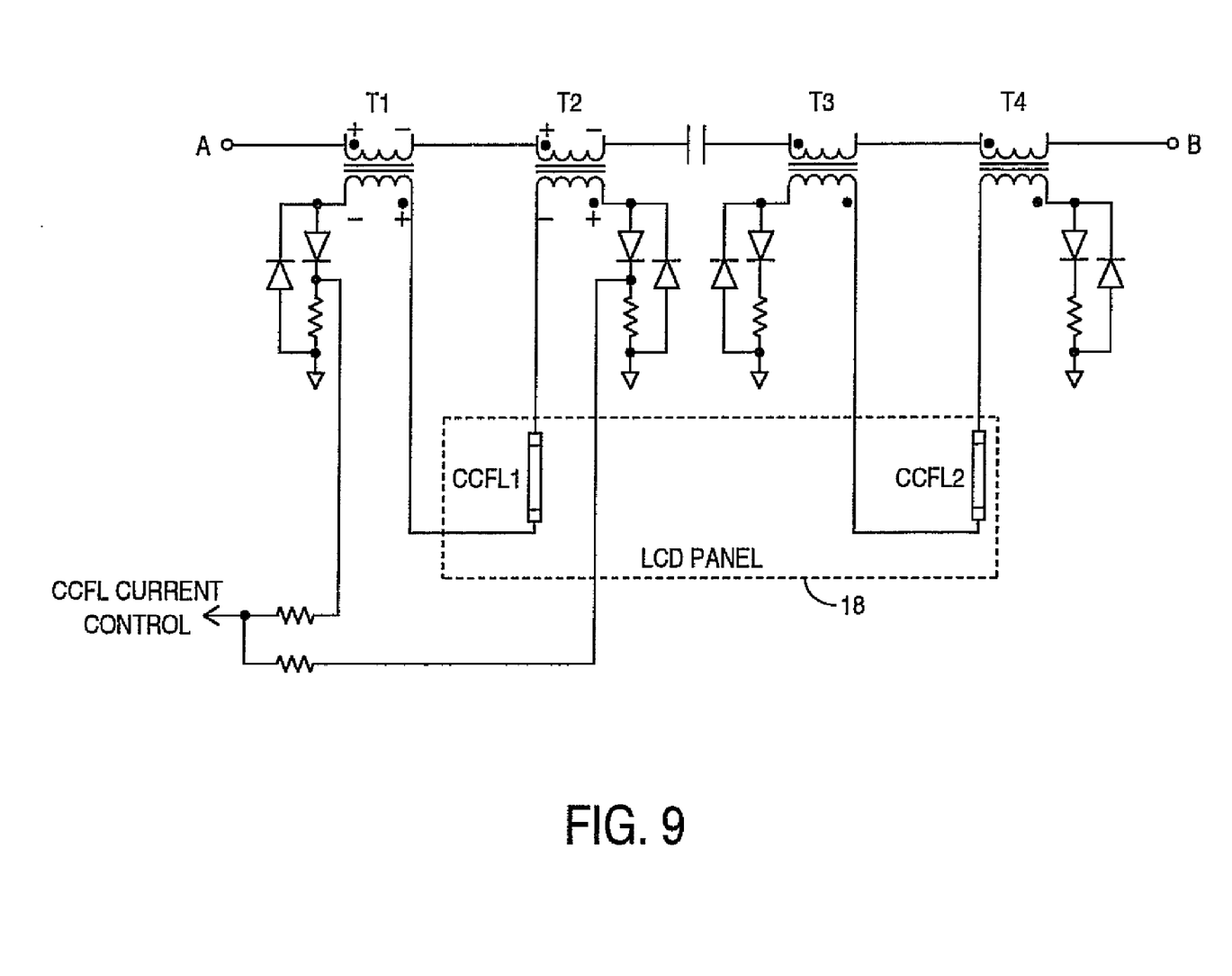
FIG. 9 is another circuit diagram of the transformers and LCD panel of the inverter topology according to the present invention and FIG. 10 depicts another driving topology utilizing two controllers and two inverter circuits per CCFL.

To remedy the difficulty, a differential driving technique is provided by the present invention. As illustrated in FIGS. 9, a long lamp can be driven with two transformers where the phase polarities of the transformers are opposite. In FIG. 9, CCFL1 is driven by the positive side of the secondary of T1 and the negative side of the secondary of T2 (the positive negative are represented in one half cycle of the sinusoidal power developed by the transformer). The center of CCFL1 is virtually positioned at zero potential. Each transformer delivers, for example 500V rms where the voltage stress and mechanical spacing for safety requirement is lower.

Figure 10:
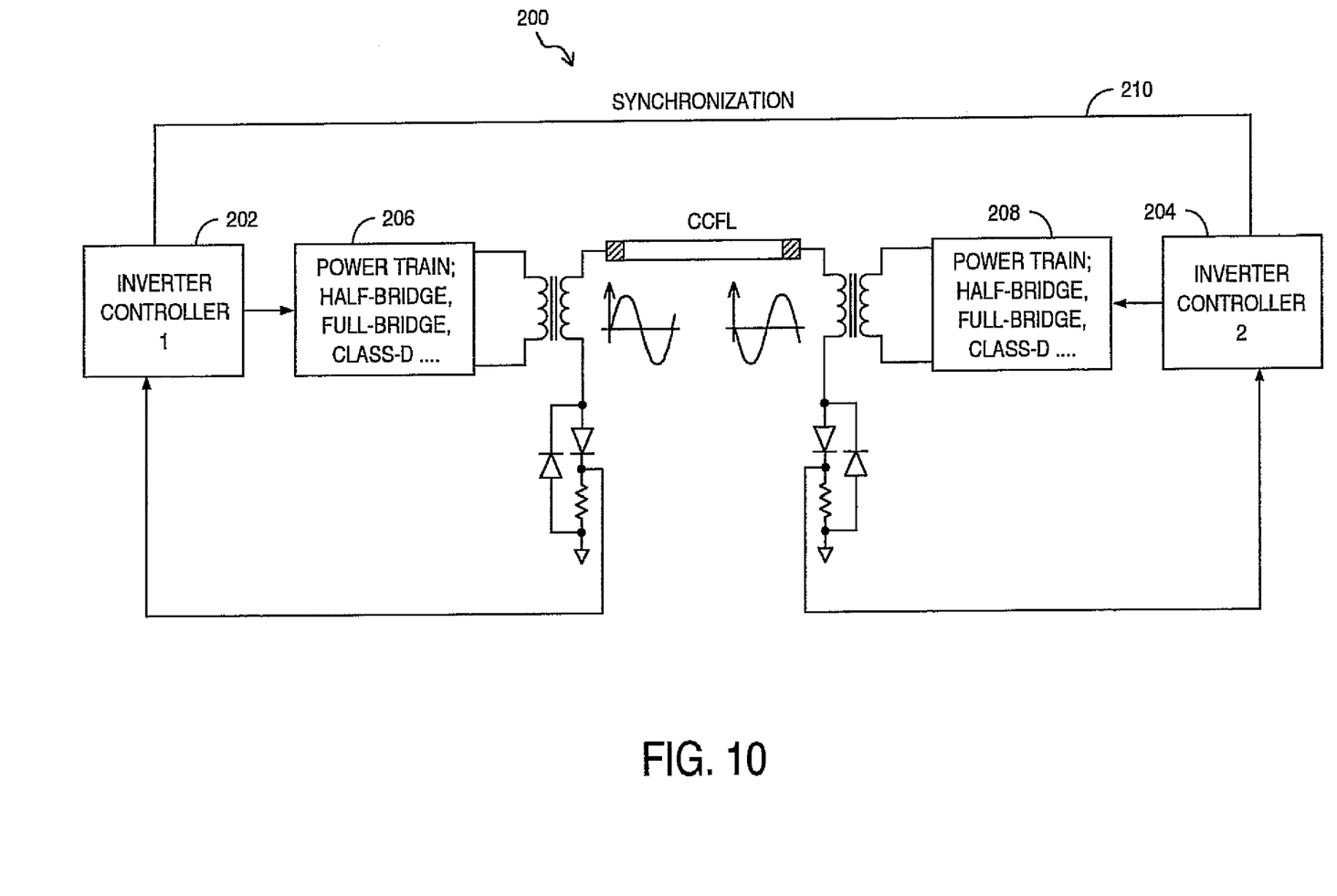

In yet another aspect, the driving techniques may be modified as shown in FIG. 10. FIG. 10 depicts a driving topology 200 utilizing two controllers 202 and 204 and two inverter circuits 206 and 208 per CCFL. The inverter circuits are coupled together using a synchronization signal 210 so that the controllers control their respective inverter circuits to generate sinusoids that are approximately 180 degrees out of phase, as shown. This ensures that the lamp receives full power from each inverter during each half cycle without cancellation of the power signals. Of course, this topology can include voltage and or current feedback to control the energy delivered to the lamp. The inverter controllers of the present invention may be conventional inverter controllers which may include dimming circuitry (e.g., burst mode, analog, and/or phase) to adjust the energy delivered to the lamps. Inverter controllers capable of controlling half bridge, full bridge, Class D and/or other inverter topologies are well known in the art, and all are deemed equivalent to the present invention. For example, U.S. Pat. Nos. 6,259,615 and 5,615,093, hereby incorporated by reference, each disclose inverter controllers for full bridge and half bridge inverter circuits, respectively. The inverter controllers may also be implemented by, for example Part Nos, OZ960, OZ961, OZ965, OZ970, OZ971, OZ972, or OZ9RR, manufactured by O2 Micro International Limited.

Figure 7:
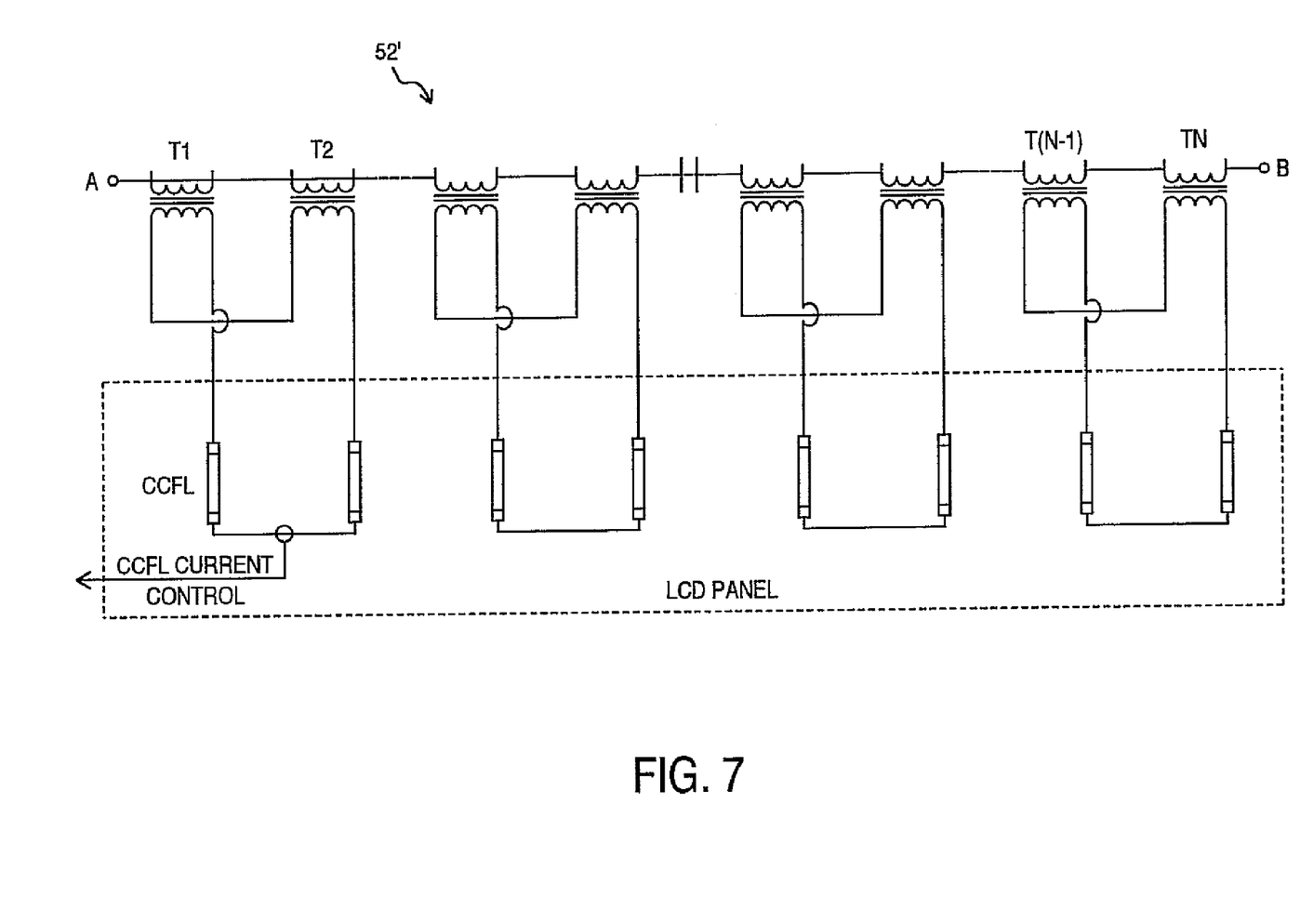
FIG. 7 is another circuit diagram of the transformers and LCD panel of the inverter topology according to the present invention.

Also, it will be readily apparent to those skilled in the art that the figures depict an LCD panel that includes circuitry to generate a voltage and/or current feedback signal indicative of the voltage and/or current conditions at the lamp load. The inverter controller depicted herein is also adapted to receive this feedback information to adjust the voltage and/or current supplied to the lamp loads. In the exemplary embodiments, current feedback can be generated from a single lamp in the two lamp panel of FIGS. 5 and 5A, or from two lamps in an N lamp panel as shown in FIGS. 6, 7 and 8. In FIG. 9, the current feedback control signals are generated from the portion of the transformer secondary side that is not coupled to the lamp. In this manner, each half cycle of current to the lamp is monitored. Likewise, voltage feedback control signals can be generated in a manner understood in the art.

In the exemplary embodiments, the transformers are coupled to the power supply as controlled by the inverter controller. The inverter controller generates a high voltage AC signal (square wave) from the high voltage DC signal source. In turn, the transformers produce high voltage sinusoidal power from the high voltage AC signal to power the lamps. Of course, the present invention can use a low voltage DC power source, in which case the transformers will be adapted to step up the voltage to an appropriate level to power the lamps. Those skilled in the art will recognize numerous modifications to the present invention, all of which are deemed within the spirit and scope of the present invention only as limited by the claims.

The invention claimed is:

1. A DC/AC inverter circuit, comprising:
   a transformer comprising a primary winding for receiving an AC signal, and comprising a first secondary winding and a second secondary winding;
   a first cold cathode florescent lamp (CCFL) coupled to said first secondary winding and said second secondary winding in series, said first CCFL comprising a first end coupled to a positive polarity terminal of said first secondary winding and a second end coupled to a negative polarity terminal of said second secondary winding,
   wherein said first end of said first CCFL is coupled to ground through said positive polarity terminal of said first secondary winding and a negative polarity terminal of said first secondary winding, and wherein said second end of said first CCFL is coupled to ground through said negative polarity terminal of said second secondary winding and a positive polarity terminal of said second secondary winding.

2. The DC/AC inverter circuit as claimed in claim 1, further comprising:
   a current feedback circuit coupled in series with said first CCFL, said first secondary winding and second secondary winding, and operable for providing a current feedback signal to said inverter controller indicative of a current flowing through said first CCFL.

3. The DC/AC inverter circuit as claimed in claim 2, wherein said inverter controller adjusts said current flowing through said first CCFL according to said current feedback signal.

4. The DC/AC inverter circuit as claimed in claim 1, wherein said current feedback circuit comprises:
   a first current sensor coupled to said first secondary winding and operable for providing a first current sensing signal indicative of a current flowing through said first secondary winding; and
   a second current sensor coupled to said second secondary winding and operable for providing a second current sensing signal indicative of a current flowing through said second secondary winding.

5. The DC/AC inverter circuit as claimed in claim 4, wherein said current feedback signal is generated according to said first current sensing signal and said second current sensing signal.

6. The DC/AC inverter circuit as claimed in claim 4, wherein said first current sensor is coupled to a negative polarity terminal of said first secondary winding, and wherein said second current sensor is coupled to a positive polarity terminal of said second secondary winding.

7. The DC/AC inverter circuit as claimed in claim 1, wherein an output AC signal at said positive polarity terminal of said first secondary winding is approximately 180 degree out of phase with respect to an output AC signal at said negative polarity terminal of said second secondary winding.

8. The DC/AC inverter circuit as claimed in claim 1, further comprising:
   an inverter controller coupled to a power train and operable for converting a DC signal to said AC signal.

9. The DC/AC inverter circuit as claimed in claim 8, wherein said inverter controller adjusts said voltage across said first CCFL according to said voltage feedback signal.

10. The DC/AC inverter circuit as claimed in claim 1, further comprising:
    a second CCFL coupled to said first secondary winding and said second secondary winding in series, said second CCFL comprising a first end coupled to said negative polarity terminal of said second secondary winding and a second end coupled to said positive polarity terminal of said first secondary winding; and
    a capacitor divider feedback circuit electrically coupled between said first CCFL and said second CCFL at a point between said first end of said first CCFL and said positive polarity terminal of said first secondary winding and also at a point between said first end of said second CCFL and said negative polarity terminal of said second secondary winding, said capacitor divider feedback circuit operable for providing a voltage feedback signal to an inverter controller, said voltage feedback signal generated using voltage feedback information taken from both said first and second CCFLs.

11. The DC/AC inverter circuit as claimed in claim 10, wherein said capacitor divider feedback circuit comprises:
    a first capacitor divider electrically coupled to said first secondary winding and operable for providing a first voltage sensing signal indicative of a voltage across said first secondary winding; and
    a second capacitor divider electrically coupled to said second secondary winding and operable for providing a second voltage sensing signal indicative of a voltage across said second secondary winding.

12. The DC/AC inverter circuit as claimed in claim 11, wherein said voltage feedback signal is generated according to said first voltage sensing signal and said second voltage sensing signal.

13. The DC/AC inverter circuit as claimed in claim 11, wherein said first capacitor divider is coupled between said positive polarity terminal of said first secondary winding and ground, and wherein said second capacitor divider is coupled between said negative polarity terminal of said second secondary winding and ground.

14. A display system, comprising:
    a display panel;
    an inverter controller coupled to a power train and operable for converting a DC signal to an AC signal;
    a transformer coupled to said power train and comprising a first primary winding and a second primary winding coupled in series and operable for receiving said AC signal, and comprising a first secondary winding and a second secondary winding;

a cold cathode florescent lamp (CCFL) coupled to said first secondary winding and said second secondary winding in series and operable for illuminating said display panel, said CCFL comprising a first end coupled to a positive polarity terminal of said first secondary winding and a second end coupled to a negative polarity terminal of said second secondary winding;

a current feedback circuit coupled in series with said CCFL, said first secondary winding and second secondary winding, and operable for providing a current feedback signal to said inverter controller indicative of a current flowing through said CCFL; and a capacitor divider feedback circuit coupled to said CCFL and operable for providing a voltage feedback signal to said inverter controller indicative of a voltage across said CCFL, wherein said first end of said CCFL is coupled to ground through said positive polarity terminal of said first secondary winding and a negative polarity terminal of said first secondary winding, and wherein said second end of said CCFL is coupled to ground through said negative polarity terminal of said second secondary winding and a positive polarity terminal of said second secondary winding.

15. The display system as claimed in claim 14, wherein said capacitor divider feedback circuit comprises:

a first capacitor divider coupled to said first secondary winding and operable for providing a first voltage sensing signal indicative of a voltage across said first secondary winding; and a second capacitor divider coupled to said second secondary winding and operable for providing a second voltage sensing signal indicative of a voltage across said second secondary winding.

16. The display system as claimed in claim 15, wherein said voltage feedback signal is generated according to said first voltage sensing signal and said second voltage sensing signal.

17. The display system as claimed in claim 15, wherein said first capacitor divider is coupled between said positive polarity terminal of said first secondary winding and ground, and wherein said second capacitor divider is coupled between said negative polarity terminal of said second secondary winding and ground.

18. The display system as claimed in claim 14, wherein said current feedback circuit comprises:

a first current sensor coupled to said first secondary winding and operable for providing a first current sensing signal indicative of a current flowing through said first secondary winding; and a second current sensor coupled to said second secondary winding and operable for providing a second current sensing signal indicative of a current flowing through said second secondary winding.

19. The display system as claimed in claim 18, wherein said current feedback signal is generated according to said first current sensing signal and said second current sensing signal.

20. The display system as claimed in claim 18, wherein said first current sensor is coupled to a negative polarity terminal of said first secondary winding, and wherein said second current sensor is coupled to a positive polarity terminal of said second secondary winding.

21. The display system as claimed in claim 14, wherein an output AC signal at said positive polarity terminal of said first secondary winding is approximately 180 degree out of phase with respect to an output AC signal at said negative polarity terminal of said second secondary winding.

22. The display system as claimed in claim 14, wherein said inverter controller adjusts said current flowing through said CCFL according to said current feedback signal.

23. The display system as claimed in claim 14, wherein said inverter controller adjusts said voltage across said CCFL according to said voltage feedback signal.

24. A method for providing power to a cold cathode fluorescent lamp (CCFL) of a display system, said method comprising:

receiving an AC signal by a primary winding of a transformer;

generating a first output AC signal at a positive polarity terminal of a first secondary winding of said transformer;

generating a second output AC signal at a negative polarity terminal of a second secondary winding of said transformer;

powering a first terminal of said CCFL by said first output AC voltage and powering a second terminal of said CCFL by said second output AC voltage, wherein said CCFL is coupled to said first secondary winding and said second secondary winding in series and is coupled between said positive polarity terminal of said first secondary winding and said negative polarity terminal of said second secondary winding, wherein the center of said CCFL is positioned at zero potential;

receiving a voltage feedback signal from a capacitor divider feedback circuit indicative of a voltage across said CCFL; and controlling power of said CCFL according to said voltage feedback signal.

25. The method as claimed in claim 24, further comprising:

receiving a current feedback signal indicative of a current flowing through said CCFL; and controlling power of said CCFL according to said current feedback signal.

26. The method as claimed in claim 24, wherein said first output AC signal is approximately 180 degree out of phase with respect to said second output AC signal.

27. The method as claimed in claim 24, further comprising:

providing a first current sensing signal indicative of a current flowing through said first secondary winding by a first current sensor coupled to said first secondary winding;

providing a second current sensing signal indicative of a current flowing through said second secondary winding by a second current sensor coupled to said second secondary winding; and generating said current feedback signal according to said first current sensing signal and said second current sensing signal.

28. The method as claimed in claim 24, further comprising:

providing a first voltage sensing signal indicative of a voltage across said first secondary winding by a first capacitor divider electrically coupled to said first secondary winding;

providing a second voltage sensing signal indicative of a voltage across said second secondary winding by a second capacitor divider electrically coupled to said second secondary winding; and generating said voltage feedback signal according to said first voltage sensing signal and said second voltage sensing signal.

* * * * *